May 25, 1926.
G. F. STORM
TUBE LEAK DETECTOR
Filed Oct. 14, 1925
1,586,127
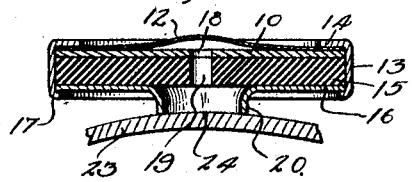
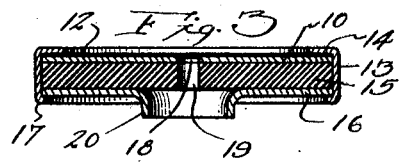
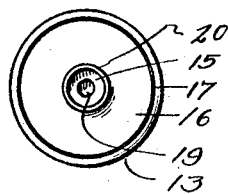
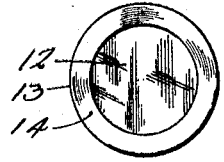
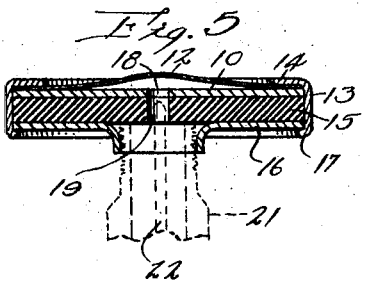
Inventor
Gustav F. Storm
By
Bair Freeman & Latty
Attys Patented May 25, 1926.

1,586,127

UNITED STATES PATENT OFFICE.

GUSTAV F. STORM, OF SANBORN, IOWA.

TUBE-LEAK DETECTOR.

Application filed October 14, 1925. Serial No. 62,470.

My invention relates to a leak detector for tires, and an object of my invention is to provide such a detector which may be applied either to the valve stem or to the surface of an inner tube of a tire.

A further object is to provide such a detector which is of simple, durable and inexpensive construction.

Another object is to provide a device of the character mentioned, which is extremely sensitive in detecting slow leaks, or the like, from which the quantity of escaping air is not great.

More specifically, in order to carry out the last mentioned object, my invention is embodied in a device employing a rubber diaphragm secured flat against an apertured disk in such a manner that an expansible chamber of relatively large diameter is provided between the diaphragm and the disk, which chamber is of minimum volume before the entrance of air thereto, whereby a small increase in the amount of air in the chamber will serve to noticeably bulge the diaphragm away from the disk, the wide diameter of the diaphragm allowing the same to expand readily under slight pressure.

A further object is to provide such a device having a neck communicating with the opening in the disk, and adapted to receive a valve stem, the construction being such that a washer or gasket of yieldable material may be readily incorporated in the device in such a manner as to seal the device against the edge of the valve stem when the device is applied thereto.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a plan view of the detector.

Fig. 2 is an inverted plan of the same.

Fig. 3 is a central sectional view through the same.

Fig. 4 is a similar sectional view illustrating the device applied to the surface of an inner tube.

Fig. 5 is a similar sectional view illustrating the device applied to a valve stem, indicated in dotted lines.

I am aware that it is not new to use a flexible diaphragm of rubber, or the like, forming part of a chamber adapted to be applied over a leak so as to receive the escaping air and detect the leak by the distention of the diaphragm. However, most of such devices are not sensitive enough to detect the ordinary slow leak in which the air is escaping at a very slow rate.

I find that by stretching a diaphragm over a flat plate or disk of metal or stiff material having an aperture through which the air may be received, an air chamber may be formed which is very small in volume and yet has a potential capacity which is great enough that the rubber or flexible diaphragm will not resist appreciably the tendency of the incoming air to distend the diaphragm.

The elasticity of a rubber diaphragm tending to resist stretching will cause the air to be compressed, to a certain extent, within a chamber of which the diaphragm forms a part. If the volume of the chamber is large, this resistance of the diaphragm to stretching will be much more effective in maintaining the volume of the chamber substantially the same after the chamber has received a small additional amount of air, than would be the case were the chamber of relatively small volume. This is due to the fact that a large quantity of air may be diminished in volume to a greater extent than a small quantity by a given pressure.

For instance, if a closed chamber containing one hundred cubic centimeters of air at atmospheric pressure, were subjected to a pressure sufficient to reduce that volume ten cubic centimeters, the same pressure applied to one cubic centimeter of air at atmospheric pressure would only be effective in reducing that volume but a small fraction of a cubic centimeter.

It follows, therefore, that by providing a chamber which is initially small, and which includes a diaphragm of such size as to offer a relatively small resistance to distention, a given quantity of air added to the air already within the chamber will serve to distend the diaphragm much more appreciably than the effect produced by an equal quantity of air upon an equally large diaphragm covering a larger chamber, or upon a smaller diaphragm covering a chamber of the same volume.

The sensitiveness of the instrument is increased by forming the chamber with two sides which are flat and compressed against each other, one side being non-elastic and non-flexible so that the entire effect of the air will be received by the diaphragm. The effect is further enhanced by stretching the diaphragm or securing it against the flat surface so that in its normal position it will appear perfectly flat to the eye. A slight curvature from a perfectly flat position will be more readily noticed than an added curvature from an already curved position.

The diaphragm, 12, of thin rubber, or the like, is held in place against the disk, 10, by means of a ring, 13, having an inwardly extending lateral flange, 14. The ring, 13, is stamped of sheet metal, and the disk, 10, inserted therein with the diaphragm, 12, lying flat against its face and received between the flange, 14, and the disk. A rubber gasket or washer, 15, which is of equal diameter with the disk, 10, is next inserted within the ring, 13, and against the outer face of the washer is placed a casing plate, 16. The entire assembly is then placed in a die which crimps the edge of the ring, 13, around the edge of the plate, 16, as at 17. The parts are all die-stamped and die-assembled, and it will be seen that the construction is thus very inexpensive.

The disk, 10, is provided with an opening, 18, and the washer, 15, is provided with an aligned opening, 19, which together provide a passageway of limited volume through which air may enter the space between the diaphragm, 12, and the disk, 10.

The ratio between the diameter of the openings, 18 and 19, and the diameter of the chamber formed between the diaphragm and the disk, which chamber is limited at its outer extremity by the inner edge of the flange, 14, is considerable, as shown in the drawings.

The plate, 16, is provided with a neck, 20, which is just large enough in diameter to receive the end of a valve stem, 21, as shown in Fig. 5. The opening, 19, then serves to receive the valve release rod, 22, and the washer, 15, serves as a gasket to receive the edge of the valve stem so as to prevent leakage of air except into the detector chamber.

It will be noted that the neck, 20, is very shallow so as to maintain the air chamber as small as possible, and in actual practice the neck, 20, is made only deep enough so that a slight flange is provided to engage the surface of an inner tube, 23, as shown in Fig. 4.

It will now be seen that air entering the detector from a leak, as at 24, will quickly increase the volume of the air chamber formed by the openings, 18 and 19, and the space within the neck, 20, and will thereupon act upon the diaphragm, 12, so as to distend it as shown.

The disk, 10, serves to prevent pressure of the valve stem, 21, against the washer from distorting the lower surface of the air chamber formed between the disk and the diaphragm, 12.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A leak detector including a substantially flat disk having an opening, and an elastic diaphragm on one face of said disk and sealed thereagainst along a line encircling said opening and enclosing an area at least several times larger than that of the opening.

2. A leak detector including a substantially flat disk having an opening, an elastic diaphragm on one face of said disk and sealed thereagainst along a line encircling said opening and enclosing an area at least several times larger than that of the opening, and a relatively short neck communicating with said opening and having an end adapted to be applied to a tire valve stem, or to the region surrounding a leak in a tube.

3. A leak detector including a substantially flat disk having an opening, an elastic diaphragm on one face of said disk and sealed thereagainst along a line encircling said opening and enclosing an area at least several times larger than that of the opening, said disk having a surface of yieldable material on its side opposite the diaphragm, surrounding said opening.

4. A leak detector including a substantially flat disk having an opening, an elastic diaphragm on one face of said disk and sealed thereagainst along a line encircling said opening and enclosing an area at least several times larger than that of the opening, said disk having a surface of yieldable material on its side opposite the diaphragm, surrounding said opening, and a relatively short neck communicating with said opening and having an end adapted to receive a tire valve stem.

5. A leak detector including a substantially flat disk having an opening, and an elastic diaphragm on one face of said disk, a washer of yieldable material engaged against the other face of said disk and having an opening registering with the disk opening, and a casing comprising a plate and a ring, the ring having an inwardly extending flange engaged against the peripheral region of the diaphragm and having a collar enclosing the disk and washer and crimped around the edge of the plate whereby to bind the parts together, the diaphragm being sealed by said flange against the disk along a line encircling the disk opening and enclosing an area at least several times greater than that of the opening, and the plate having an opening registering with the washer opening.

6. A leak detector including a substantially flat disk having an opening, and an elastic diaphragm on one face of said disk, a washer of yieldable material engaged against the other face of said disk and having an opening registering with the disk opening, and a casing comprising a plate and a ring, the ring having an inwardly extending flange engaged against the peripheral region of the diaphragm and having a collar enclosing the disk and washer and crimped around the edge of the plate whereby to bind the parts together, the diaphragm being sealed by said flange against the disk along a line encircling the disk opening and enclosing an area at least several times greater than that of the opening, and the plate having an opening registering with the washer opening and having a shallow neck surrounding said opening and adapted to receive a tire valve stem.

Signed at Sioux City, in the county of Woodbury and State of Iowa, this 9th day of October, 1925.

GUSTAV F. STORM.